US012520190B2

(12) United States Patent
Wong et al.

(10) Patent No.: US 12,520,190 B2
(45) Date of Patent: Jan. 6, 2026

(54) NETWORK SLICING OVERLOAD CONTROL, VALIDATION AND DEVICE DISTRIBUTION

(71) Applicant: Meta Platforms, Inc., Menlo Park, CA (US)

(72) Inventors: Curt Wong, Bellevue, WA (US); Yi Lu, Kirkland, WA (US); Jimin Liu, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 500 days.

(21) Appl. No.: 18/068,943

(22) Filed: Dec. 20, 2022

(65) Prior Publication Data

US 2024/0205737 A1     Jun. 20, 2024

(51) Int. Cl.
*H04W 28/02*     (2009.01)

(52) U.S. Cl.
CPC ............................... *H04W 28/0289* (2013.01)

(58) Field of Classification Search
CPC ............. H04W 28/0289; H04W 28/02; H04W 28/0242; H04W 28/0247
See application file for complete search history.

(56) References Cited

U.S. PATENT DOCUMENTS

| 2022/0038953 | A1* | 2/2022 | Corston-Petrie | H04W 28/088 |
| 2023/0254267 | A1* | 8/2023 | Kolan | H04W 28/0268 |
| | | | | 709/226 |
| 2023/0337053 | A1* | 10/2023 | Marupaduga | H04W 36/13 |
| 2024/0015599 | A1* | 1/2024 | Godin | H04W 36/22 |
| 2024/0334282 | A1* | 10/2024 | Xing | H04W 36/00 |

* cited by examiner

*Primary Examiner* — Asad M Nawaz
*Assistant Examiner* — Najeeb Ansari
(74) *Attorney, Agent, or Firm* — EVERSHEDS SUTHERLAND (US) LLP

(57) ABSTRACT

Systems, apparatuses and methods provide technology that determines that a primary slice of a plurality of slices of a communication network is overloaded. The plurality of slices includes a backup slice. The technology assigns user equipment to operate with the backup slice in response to the primary slice being overloaded. The technology identifies that a trigger has occurred, wherein the trigger is associated with one or more of the user equipment, the backup slice or the primary slice, and re-assigns the user equipment to the primary slice from the backup slice so that the user equipment operates with the primary slice.

20 Claims, 7 Drawing Sheets

NETWORK SLICING OVERLOAD CONTROL, VALIDATION AND DEVICE DISTRIBUTION

TECHNICAL FIELD

Examples generally relate to dynamically switching user equipment between different network slices. In particular, examples identify when to dynamically switch user equipment between a backup slice of a network and a primary slice of the network.

BACKGROUND

A network may contain several slices. Network slicing is a method of creating multiple unique logical and virtualized networks (e.g., network slices) over a common multi-domain infrastructure. Network slicing enables the operation of multiple logical networks as virtually independent business operations on a common physical infrastructure. Each of the slices may be assigned to a different business operation and/or organization. An organization may have user equipment that transmits data over a primary slice of the network slices. That is, the primary slice may be "owned" by the organization (e.g., the organization is a primary and/or exclusive user of the primary slice). When the primary slice has reached a resource capacity (e.g., bandwidth, processing power, etc.), the network may deny further access of the primary slice from new devices or shift the new devices toward a different slice (e.g., a backup slice) of the network slices that is not overloaded.

Operating user equipment on the backup slice may present several problems. For example, there is no guarantee that a quality-of-service is ensured on the backup slice. That is, the primary slice may be dedicated to the organization, and therefore certain configurations (e.g., security protocols, prioritized access, latency, throughput, capacity, etc.) may be adopted to conform to requirements of the organization. No such guarantee may exist and/or be feasible with the backup slice. Furthermore, costs (e.g., penalties) may be increased since the backup slice is not dedicated to the organization and may be considered an overflow service which incurs significant cost for the organization.

SUMMARY

Some examples include at least one computer readable storage medium comprising a set of instructions, which when executed by a computing system, cause the computing system to determine that a primary slice of a plurality of slices of a communication network is overloaded. The plurality of slices includes a backup slice. Such examples further assign user equipment to operate with the backup slice in response to the primary slice being overloaded, identify that a trigger has occurred, wherein the trigger is associated with one or more of the user equipment, the backup slice or the primary slice, and re-assign the user equipment to the primary slice from the backup slice so that the user equipment operates with the primary slice.

Some examples include a system comprising one or more processors, and a memory coupled to the one or more processors. The memory comprises instructions executable by the one or more processors, the one or more processors being operable when executing the instructions to determine that a primary slice of a plurality of slices of a communication network is overloaded, where the plurality of slices includes a backup slice, assign user equipment to operate with the backup slice in response to the primary slice being overloaded, identify that a trigger has occurred, wherein the trigger is associated with one or more of the user equipment, the backup slice or the primary slice, and re-assign the user equipment to the primary slice from the backup slice so that the user equipment operates with the primary slice.

Some examples include a method comprising determining that a primary slice of a plurality of slices of a communication network is overloaded, where the plurality of slices includes a backup slice. Such examples further assign user equipment to operate with the backup slice in response to the primary slice being overloaded, identify that a trigger has occurred, wherein the trigger is associated with one or more of the user equipment, the backup slice or the primary slice, and re-assign the user equipment to the primary slice from the backup slice so that the user equipment operates with the primary slice.

BRIEF DESCRIPTION OF THE DRAWINGS

The various advantages of the examples will become apparent to one skilled in the art by reading the following specification and appended claims, and by referencing the following drawings, in which:

DESCRIPTION OF EMBODIMENTS

Data is dynamically transmitted through slices, meaning that slices may have varying amounts of data transmissions during a time period. Thus, sending data through a backup slice during an overload condition is a dynamically adjustable event that may fluctuate. That is, a primary slice may not remain in an overloaded state into perpetuity. Rather, at some point, it is likely that the primary slice will reduce in load and may in fact, be able to support more user equipment. For example, the primary slice (e.g., a network slice) overload may only occur for a short duration (e.g., few minutes), thereafter the primary slice may no longer be overloaded and is able to support user equipment that was shifted to the backup slice.

Examples may allocate user equipment to a backup slice (or alternative slice, S-Network Slice Selection Assistance Information (NSSAI)) for a minimal amount of time and then switch the user equipment back to the primary slice as soon as possible to efficiently allocate resources and reduce costs associated with network usage. That is, utilization of the backup slice may be expensive (e.g., using extra network resources that are only temporary or borrowed from other infrastructure pools). Furthermore, doing so may be inefficient since an overload condition of the primary slice may subside leaving unutilized resources in the primary slice which may support additional user equipment. Furthermore, switching back the user equipment back to the primary slice from the backup slice may increase the amount of time that configurations and quality-of-service standards associated with the user device are met by the primary slice.

Other implementations may not fully address situations when an overload condition of the primary slice is subsided. Thus, user equipment which was assigned to operate on the backup slice due to primary slice constraints will continue to operate on the backup slice even when the overload condition subsides. Some examples allow the user equipment to switch a user session (e.g., a Protocol Data Unit (PDU) session) back to the primary slice so the user equipment does not operate on the backup slice (e.g., an alternative and/or compatible slice) for longer than a minimum duration that corresponds to a time period that the primary slice is overloaded.

Figure 1:
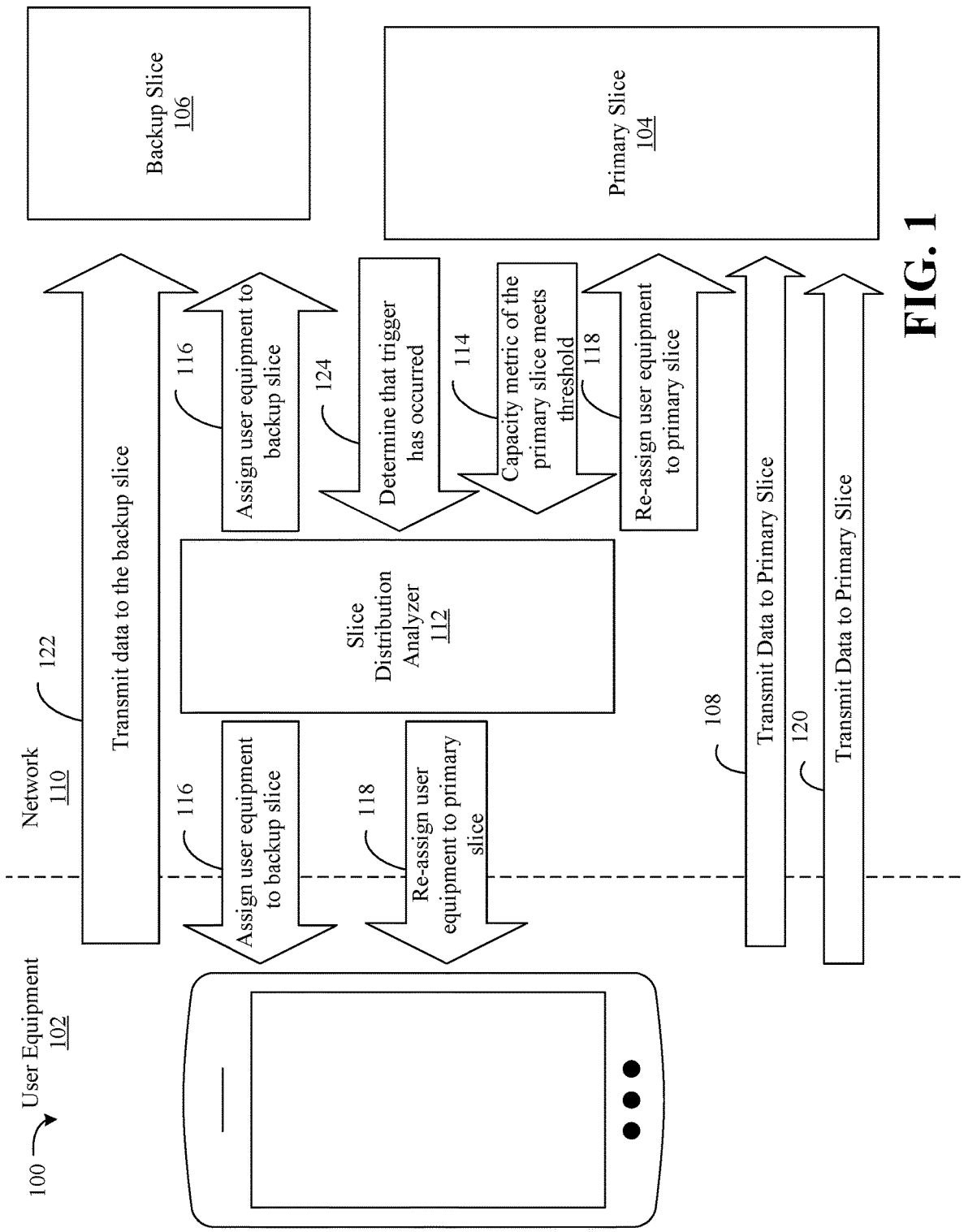
FIG. 1 is an example of a network-slice computing architecture according to an example.

Turning now to FIG. 1, a network-slice computing architecture 100 includes a user equipment 102 and a network 110. The computing architecture 100 may be implemented in a computing system. For example, the computing architecture 100 may be implemented in a computing device, computing system (e.g., hardware, configurable logic, fixed-function logic hardware, at least one computer readable storage medium comprising a set of instructions for execution, etc.). In some examples, the network 110 is a 5G network architecture. A PDU session may be an association between user equipment 102 (e.g., user device, computing device, laptop, server, etc.) and the network 110 and/or slice of the network 110. The PDU session may use an internet protocol, Ethernet or Unstructured (e.g., transparent to the network architecture) to convey data. Data transmissions with the user equipment 102 may occur after a PDU session to the network 110 is established in a network slice. A respective slice associated with the PDU session is provided to an access network, and to policy and charging entities, to apply slice specific policies.

In this example, initially the user equipment 102 (e.g., a user device) is connected with the primary slice 104. For example, the user equipment 102 communicates via the primary slice 104. For example, the user equipment 102 may transmit data to the primary slice 104 and the primary slice 104 may distribute data (e.g., video packets, audio packets, email packets, texting packets, etc.) to destinations (e.g., other computing devices, other networks, etc.). Similarly, the user equipment 102 may receive data (e.g., video packets, audio packets, email packets, texting packets, etc.) from other computing devices and/or networks through the primary slice 104. Thus, the user equipment 102 communicates over the primary slice 104.

The network 110 further includes a slice distribution analyzer 112. The slice distribution analyzer 112 may be a computing device (e.g., a server) that analyzes the primary slice 104 and backup slice 106 to determine when certain thresholds are reached. When the thresholds are reached, the slice distribution analyzer 112 may reassign user equipment from one slice of the backup slice 106 and the primary slice 104 to the other slice of the backup slice 106 and the primary slice 104.

In this example, the user equipment 102 transmits data to the primary slice 104, 108. The primary slice 104 transmits the data to destinations of the data (e.g., other computing devices, other networks, etc.). Thus, the primary slice 104 may facilitate communication for the user equipment 102.

The slice distribution analyzer 112 may determine that a capacity metric of the primary slice 104 meets threshold 114. That is, the primary slice 104 is overloaded and cannot meet quality-of-service requirements. The capacity metric may correspond to a maximum amount of devices that may be supported by the primary slice 104 without compromising quality-of-service standards. For example, the quality-of-service standards may include required data rates, throughputs, latency, security, communication protocols, etc. If one or more devices have quality-of-service standards that are unmet, the capacity metric may be deemed have met the threshold. The capacity metric may alternatively or further correspond to a maximum cutoff for data throughput supported by the primary slice 104. In some examples, the capacity metric may correspond to a bandwidth of the primary slice 104. For example, if the total data usage of user devices associated with the primary slice 104 approaches or meets the bandwidth of the primary slice 104, the capacity metric may have been deemed to have met the threshold. If the data communicated by the primary slice 104 approaches the threshold (e.g., meets) of the primary slice 104, the threshold may be deemed to have been met.

In some examples, the slice distribution analyzer 112 may analyze whether the addition of another computing device to the primary slice 104 would likely cause the capacity metric to reach the threshold. If so, the slice distribution analyzer 112 may avoid adding the computing device to the primary slice 104. Otherwise, the slice distribution analyzer 112 may add the computing device to the primary slice 104. For example, the slice distribution analyzer 112 may track and maintain a historical average of how much data usage computing devices utilize, and apply such a historical average to any new computing devices to determine whether the new computing device would cause the primary slice 104 to meet the capacity metric. Thus, in some examples the slice distribution analyzer 112 may forecast whether a new device being added to the primary slice 104 would cause the capacity metric of the primary slice 104 to meet the capacity metric, and pre-emptively assign the new device to the backup slice 106 if so.

In this example, the slice distribution analyzer 112 determines that the capacity metric of the primary slice 104 meets the threshold 114. The slice distribution analyzer 112 then rassigns the user equipment 102 to the backup slice 106, 116. In order to do so, the slice distribution analyzer 112 communicates the transition to both the backup slice 106 and the user equipment 102. The user equipment 102 may then operate with the backup slice 106. For example, the user equipment 102 may then communicate via the backup slice 106 to other networks and/or computing devices. Thus, the user equipment transmits data to the backup slice 122.

In some examples, in order to switch the user equipment 102 to the backup slice 106, the slice distribution analyzer 112 will transmit, based on the trigger having occurred, a message to the user equipment 102 that the user equipment 102 is to be re-assigned to the backup slice 106. The user equipment 102 may then initiate a switch process to switch operation of the user equipment 102 to the backup slice 106, where the switch process includes transmitting one or more session message establishment parameters to a session management function of the primary slice 104.

The slice distribution analyzer 112 and/or primary slice 104 may continue to monitor the status of the primary slice 104. At a later time, the slice distribution analyzer 112 and/or the primary slice 104 may determine that a trigger has occurred 124. For example, the trigger may be that the primary slice 104 is no longer overloaded. For example, may be the capacity metric of the primary slice 104 no longer meeting the threshold. Additionally or alternatively, the trigger may be a capacity metric of the backup slice reaching a backup capacity threshold. For example, if the backup slice 106 is overloaded, some examples will automatically switch back the user equipment 102 to the primary slice 104 to avoid incurring costly overhead associated with the user equipment 102 operating over the backup slice 106. In some examples, the trigger may be that a quality metric (e.g., a quality-of-service) of execution of the user equipment 102 on the backup slice 106 is below a threshold (e.g., poor quality-of-service). For example, if the backup slice 106 is unable to comply with quality-of-service requirement(s) of the user equipment 102, some examples will automatically switch back the user equipment 102 to the primary slice 104 to avoid incurring costly overhead associated with the user equipment 102 operating over the backup slice 106.

In some examples, the network 110 may initiate, based in part on the trigger occurring and with the primary slice 104, a switch process to switch operation of the user equipment 102 to the primary slice 104, where the switch process includes generating one or more session message establishment parameters for the user equipment 102 to communicate with destination and/or other computing devices. In such examples, the network 110 may further transmit, based on the trigger having occurred, a message to the user equipment 102 that the user equipment 102 is to be re-assigned to the primary slice 104. Such examples may further include determining that the user equipment 102 has not initiated the switch process, and determining that the primary slice 104 is to initiate the switch process based on the user equipment 102 not having initiated the switch process.

Regardless of how whether the network 110 or the user equipment 102 initiates the switch over, the slice distribution analyzer 112 may re-assign the user equipment 102 to the primary slice 104, 118 from the backup slice 106. In doing so, resources may be efficiently utilized at a reduced cost while meeting quality-of-service constraints. For example, a PDU session associated with the user equipment 102 may be communicated to at least the primary slice 104 to switch the user equipment 102 over to the primary slice. The user equipment 102 may then transmit data to the primary slice 104, 120.

Figure 2:
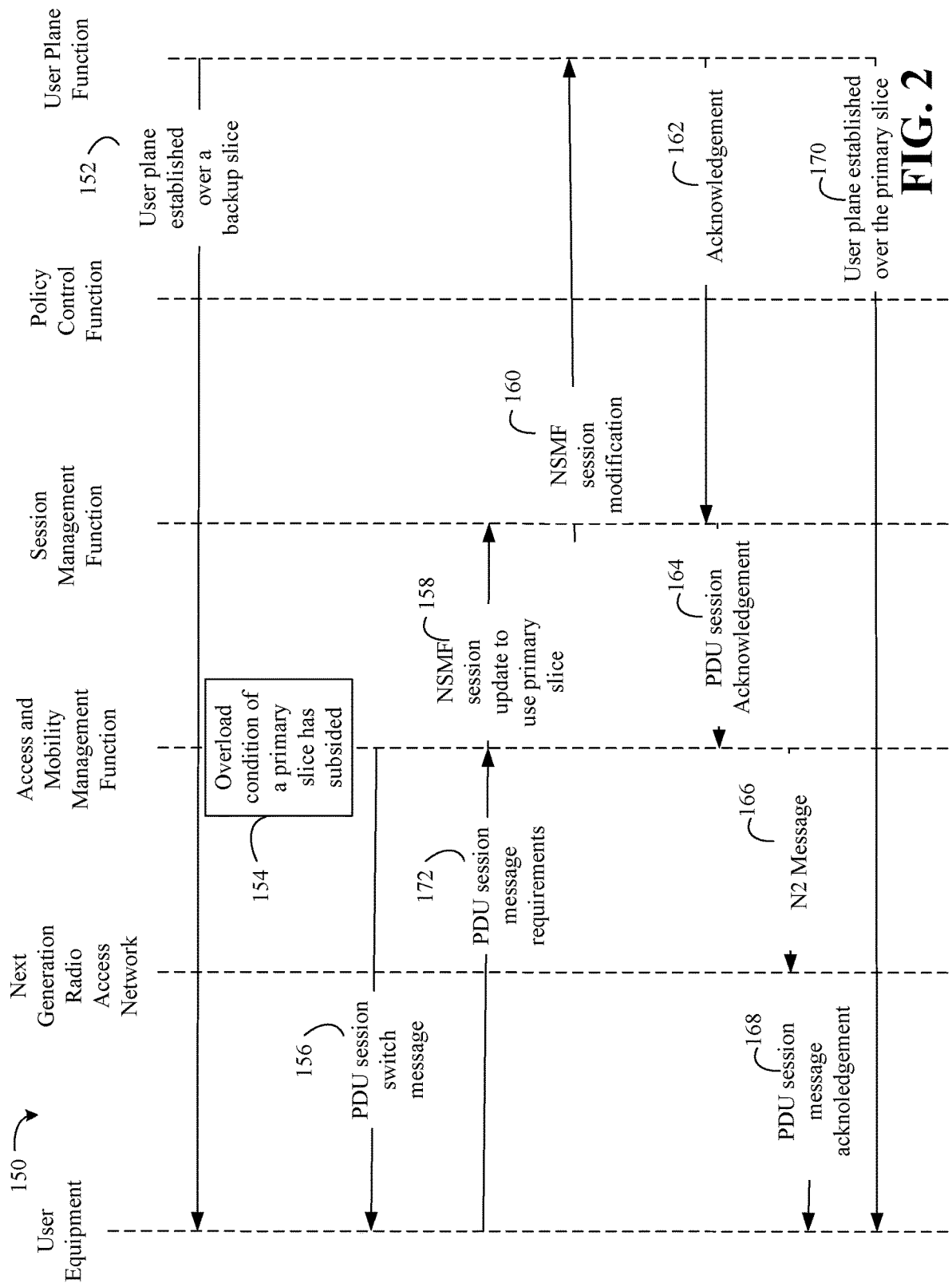
FIG. 2 is an example of a process diagram for user equipment initiated slice re-assignment according to an example.

FIG. 2 illustrates a process diagram 150 for user equipment initiated slice re-assignment according to some examples. The process diagram 150 may generally be implemented with the examples described herein, for example, computing architecture 100 (FIG. 1) already discussed. The process diagram 150 may be executed in a computing architecture. For example, the process diagram 150 may be implemented in a computing device, computing system (e.g., hardware, configurable logic, fixed-function logic hardware, at least one computer readable storage medium comprising a set of instructions for execution, etc.).

A next generation radio access network, access and mobility management function, session management function, policy control function and user plane function are part of a network. At block 152, a user plane is established over a backup slice. At illustrated processing block 154, the network, and specifically the Access and Mobility Management Function of the network, detects that the overload condition of a primary slice has subsided. For example, processing block 154 may detect that the primary slice may be used again when an overload condition has subsided. The next generation radio access network and user plane function both handle a user plane and are part of the slice. That is, some compute resources in both nodes are allocated for different slices for user plane processing.

The network then sends a PDU session switch message 156 to the user equipment. For example, the access and mobility management function may send a Non-Access Stratum (NAS, a set of protocols used to convey non-radio signaling between the User Equipment (UE) and the access and mobility management function) message. The NAS message may provide data (e.g., PDU identification, primary slice is available information) indicating which PDU session may be switched back to the primary slice.

The user equipment may then initiate the switch over. For example, the user equipment transmits a PDU session message requirements 172 to the access and mobility management function. The PDU session message may include a PDU ID, and an indication that the user equipment is to switch back to the primary slice.

The network may then provide a Network Slice Management Function (NSMF) session update to use the primary slice 158. For example, the session update may include a PDU session ID, the backup slice ID and the primary slice ID. The session management function receives the NSMF session update. The session management function transmits the NSMF session update to the primary slice 160 to use the user plane function. That is, the policy control function, user plane function and next generation radio access network are all updated to use the primary slice.

An acknowledgement 162 is transmitted from the user plane function to the session management function. The session management function transmits the PDU session acknowledgement 164 (e.g., PDU session ID, primary slice in use indication) to the access and mobility management function. The access and mobility management function provides an N2 (i.e., signaling message from Core to RAN) message 166 (e.g., PDU session ID, primary slice in use indication) to the next generation radio access network. The next generation radio access network then provides a PDU session message acknowledgement 168 (e.g., PDU session ID, primary slice in use indication) to the user equipment. As a consequence, every node in a network system may now be updated to the primary slice for the PDU session (PDU session ID). N2 may be defined as control plane protocol stacks between a 5G-Access Network (AN) and a 5G Core The user plane is established over the primary slice 170.

Figure 3:
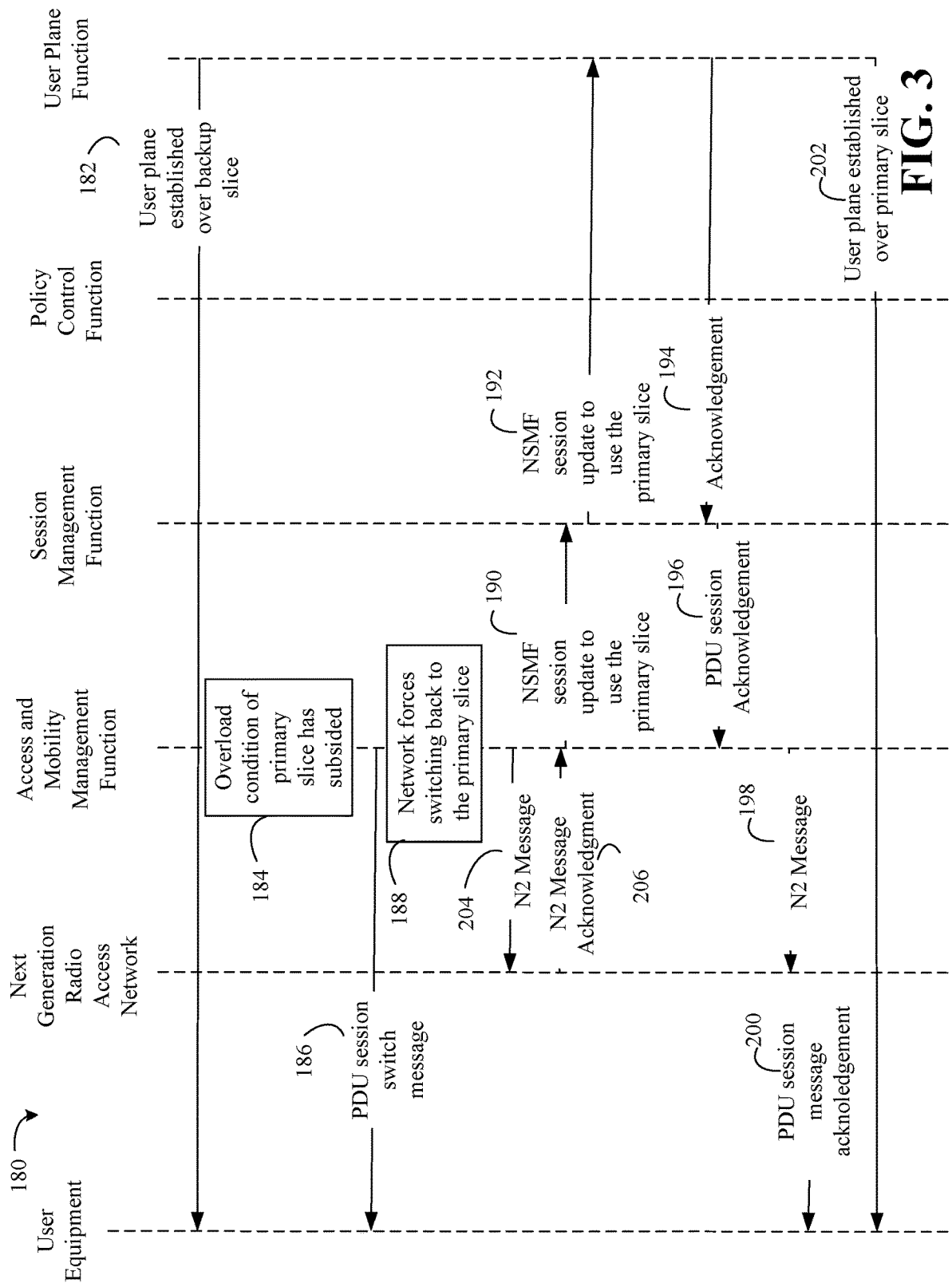
FIG. 3 is an example of a process diagram for network slice re-assignments initiated by a network according to an example.

FIG. 3 illustrates a process diagram 180 for network slice re-assignments initiated by a network. The process diagram 180 may generally be implemented with the examples described herein, for example, computing architecture 100 (FIG. 1) and/or process diagram 150 (FIG. 2) already discussed. The process diagram 180 may be executed in a computing architecture. For example, the process diagram 180 may be implemented in a computing device, computing system (e.g., hardware, configurable logic, fixed-function logic hardware, at least one computer readable storage medium comprising a set of instructions for execution, etc.).

A next generation radio access network, access and mobility management function, session management function, policy control function and user plane function are part of a network. At block 182, a user plane is established over a backup slice. At illustrated processing block 184, the network, and specifically the Access and Mobility Management Function of the network, detects that the overload condition of a primary slice has subsided. For example, processing block 184 may detect that the primary slice may be used again when an overload condition has subsided.

The network then sends a PDU session switch message 186 to the user equipment. For example, the access and mobility management function may send a NAS message. The NAS message may provide data (e.g., PDU identification, primary slice is available information) indicating which PDU session may be switched back to the primary slice.

The network may then initiate the switch over. That is, the network forces switching back to the primary slice 188. For example, the access and mobility management function may force the switching back. The access and mobility management function sends an N2 message 204 (e.g., PDU session ID, primary slice switching, etc.) to the next generation radio access network. The N2 message may indicate that a switch-back of user equipment is required. The next generation radio access network sends an N2 message acknowledgement 206 (e.g., PDU session ID, primary slice ID, backup slice ID, etc.).

The network may then provide a NSMF session update to use the primary slice 190. For example, the session update may include a PDU session ID, the backup slice ID and the primary slice ID. The session management function receives the NSMF session update. The session management function transmits the NSMF session update to use the primary slice 192 to the user plane function. That is, the policy control function, user plane function and next generation radio access network are all updated to use the primary slice.

An acknowledgement 194 is transmitted from the user plane function to the session management function. The session management function transmits the PDU session acknowledgement 196 (e.g., PDU session ID, primary slice in use indication) to the access and mobility management function. The access and mobility management function provides an N2 message 198 (e.g., similar to the N2 message described above, PDU session ID, primary slice in use indication) to the next generation radio access network. The next generation radio access network then provides a PDU session message acknowledgement 200 (e.g., PDU session ID, primary slice in use indication) to the user equipment. As a consequence, every node in a network system may now be updated to the primary slice for the PDU session (PDU session ID). The user plane is established over the primary slice 202.

Figure 4:
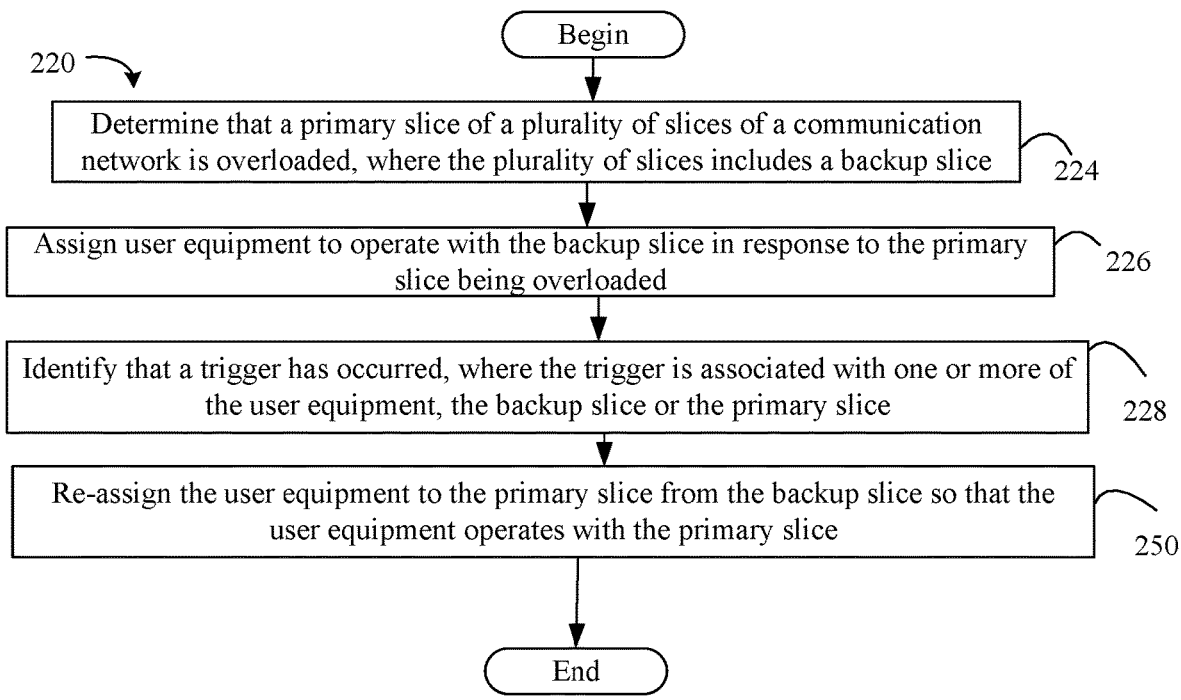
FIG. 4 is a flowchart of an example of a method of switching user equipment between different slices according to an example.

FIG. 4 illustrates a method 220 to switch user equipment between different slices. The method 220 may generally be implemented with the examples described herein, for example, computing architecture 100 (FIG. 1), process diagram 150 (FIG. 2) and/or process diagram 180 (FIG. 3) already discussed. The method 220 may be executed in a computing architecture. For example, the method 220 may be implemented in a computing device, computing system (e.g., hardware, configurable logic, fixed-function logic hardware, at least one computer readable storage medium comprising a set of instructions for execution, etc.).

Illustrated processing block 224 determines that a primary slice of a plurality of slices of a communication network is overloaded, where the plurality of slices includes a backup slice. Illustrated processing block 226 assigns user equipment to operate with the backup slice in response to the primary slice being overloaded. Illustrated processing block 228 identifies that a trigger has occurred, where the trigger is associated with one or more of the user equipment, the backup slice or the primary slice. Illustrated processing block 250 re-assigns the user equipment to the primary slice from the backup slice so that the user equipment operates with the primary slice.

In some examples, the trigger is associated with a capacity metric of the primary slice not meeting a threshold. In some examples, the trigger is associated with a capacity metric of the backup slice reaching a backup capacity threshold. In some examples, the trigger is associated with a quality metric of the user equipment associated with the backup slice.

In some examples, the method 220 further includes transmitting, from the communication network and based on the trigger having occurred, a message to the user equipment that the user equipment is to be re-assigned to the primary slice. In such examples, the method 220 further includes initiating, with the user equipment, a switch process to switch operation of the user equipment to the primary slice, where the switch process includes transmitting one or more session message establishment parameters to the primary slice. In such examples, the method 220 further includes transmitting data from the user equipment over the primary slice.

In some examples, the method 220 further includes initiating, based in part on the trigger occurring and with the primary slice, a switch process to switch operation of the user equipment to the primary slice, where the switch process includes generating one or more session message establishment parameters for the user equipment to communicate. In such examples, the method 220 further includes transmitting data from the user equipment over the primary slice. In such examples, the method 220 further includes transmitting, from the communication network and based on the trigger having occurred, a message to the user equipment that the user equipment is to be re-assigned to the primary slice. In such examples, the method 220 further includes determining that the user equipment has not initiated the switch process, and determining that the primary slice is to initiate the switch process based on the user equipment not having initiated the switch process.

Figure 5:
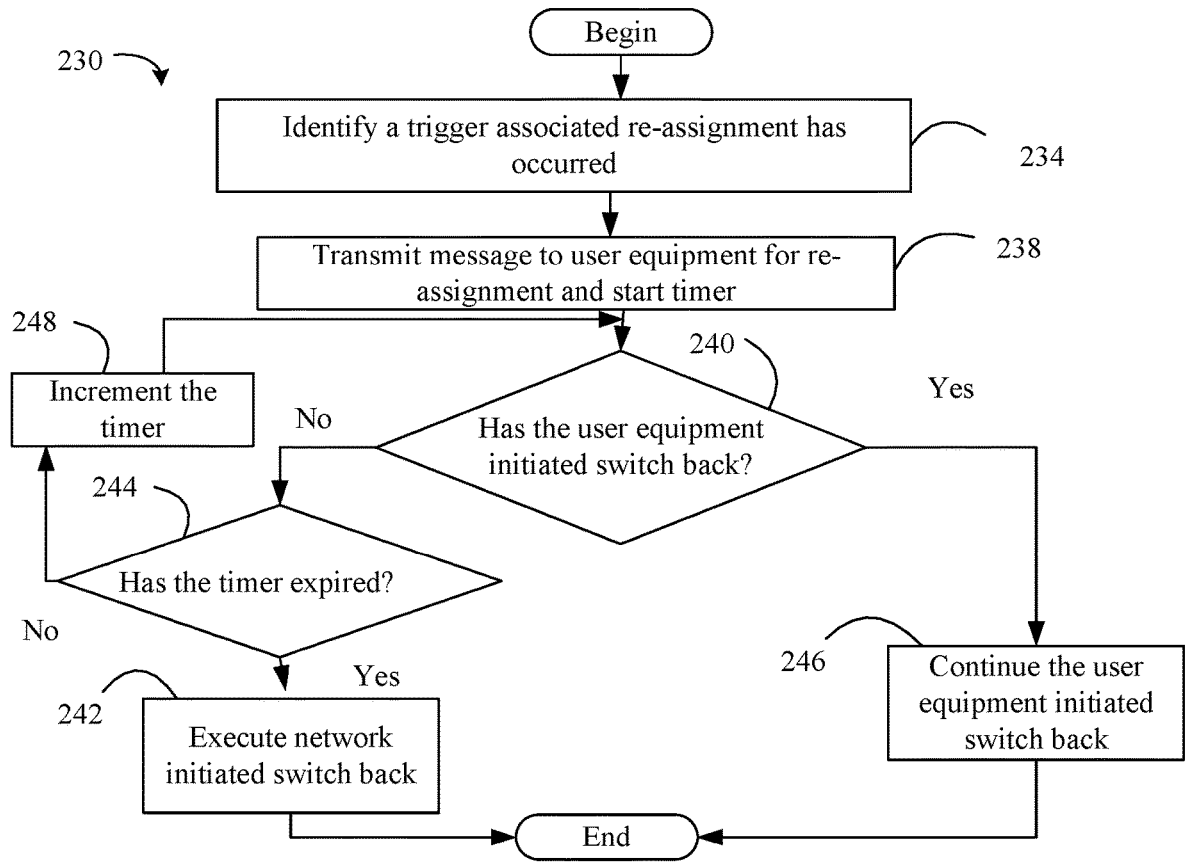
FIG. 5 is a flowchart of an example of a method to determine whether user equipment or a network initiates a slice change-over according to an example.

FIG. 5 illustrates a method 230 to determine whether user equipment or a network initiates a slice change-over. The method 230 may generally be implemented with the examples described herein, for example, computing architecture 100 (FIG. 1), process diagram 150 (FIG. 2), process diagram 180 (FIG. 3) and/or method 220 (FIG. 4) already discussed. The method 230 may be executed in a computing architecture. For example, the method 230 may be implemented in a computing device, computing system (e.g., hardware, configurable logic, fixed-function logic hardware, at least one computer readable storage medium comprising a set of instructions for execution, etc.).

Illustrated processing block 234 identifies that a trigger associated re-assignment has occurred. The re-assignment may be to re-assign user equipment from a backup slice to a primary slice. Illustrated processing block 238 transmits a message to the user equipment for re-assignment and starts a timer. Illustrated processing block 240 determines if the user equipment initiated a switch back to the primary slice from the backup slice. If not, illustrated processing block 244 determines if the timer has expired (e.g., timer may be expired when the timer reaches a threshold). If not, illustrated processing block 248 increments the timer. Otherwise, if the timer has expired in processing block 244, illustrated processing block 242 executes a network initiated switch back to re-assign the user equipment from the backup slice to the primary slice. If illustrated processing block 240 determines that the user equipment has initiated the switch back, illustrated processing block 246 continues the user equipment initiated switch back to re-assign the user equipment from the backup slice to the primary slice.

System Overview

Figure 6:
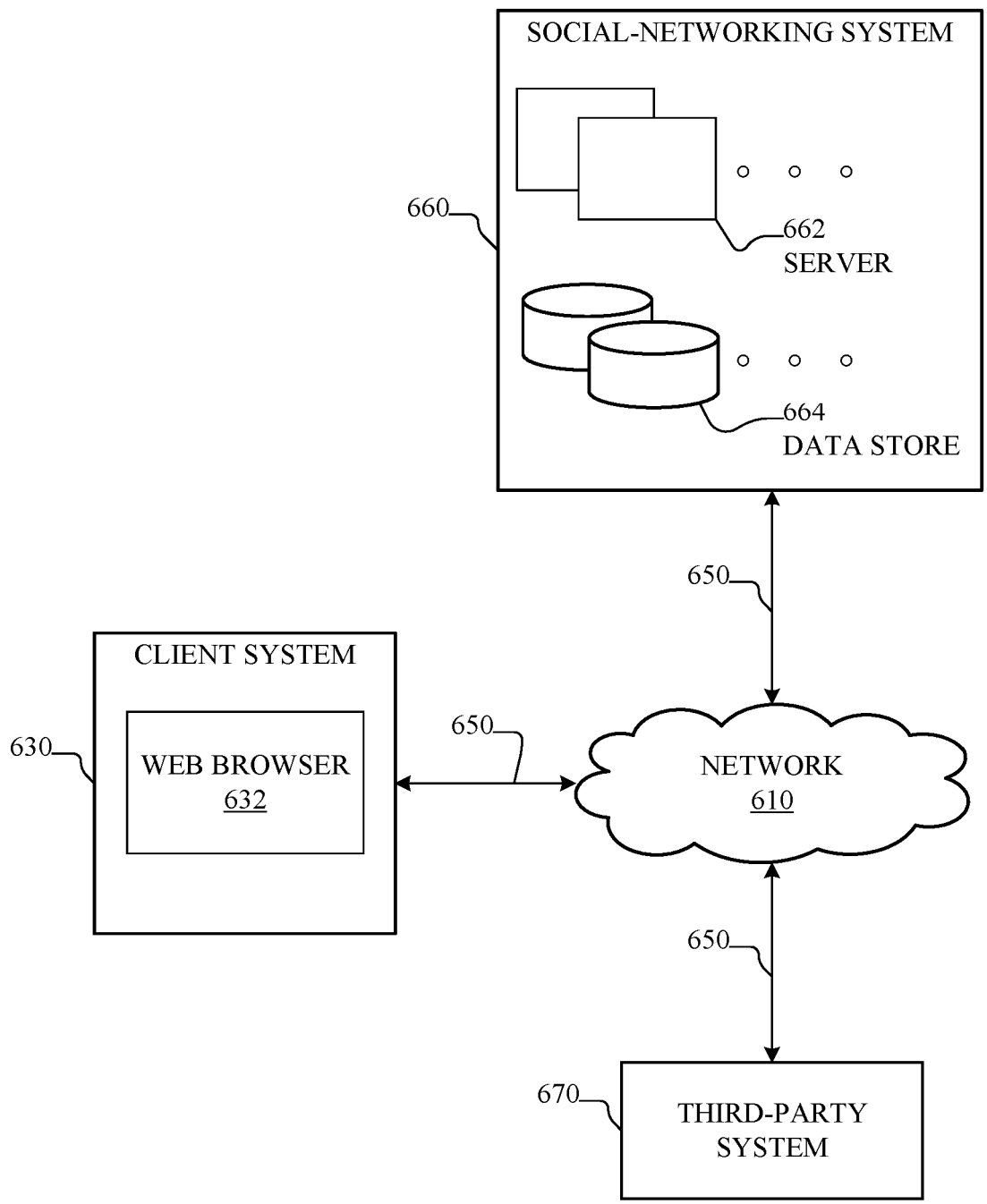
FIG. 6 illustrates an example network environment associated with a social-networking system according to an example.

FIG. 6 illustrates an example network environment 600 associated with a social-networking system. Network environment 600 may implement one or more aspects of the computing architecture 100 (FIG. 1), process diagram 150 (FIG. 2), process diagram 180 (FIG. 3) and/or method 220 (FIG. 4) and/or method 230 (FIG. 5), already discussed.

Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular examples, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular examples, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular examples, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular examples, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular examples, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular examples, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular examples, each server 662 may include hardware, software, or embedded logic components or a combination of two or more such components for carrying out the appropriate functionalities implemented or supported by server 662. In particular examples, social-networking system 660 may include one or more data stores 664. Data stores 664 may be used to store various types of information. In particular examples, the information stored in data stores 664 may be organized according to specific data structures. In particular examples, each data store 664 may be a relational, columnar, correlation, or other suitable database. Although this disclosure describes or illustrates particular types of databases, this disclosure contemplates any suitable types of databases. Particular examples may provide interfaces that enable a client system 630, a social-networking system 660, or a third-party system 670 to manage, retrieve, modify, add, or delete, the information stored in data store 664.

In particular examples, social-networking system 660 may store one or more social graphs in one or more data stores 664. In particular examples, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular examples, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular examples, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular examples, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular examples, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular examples, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular examples, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular examples, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular examples, social-networking system 660 may include a variety of servers, sub-systems, programs, modules, logs, and data stores. In particular examples, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular examples, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 7:
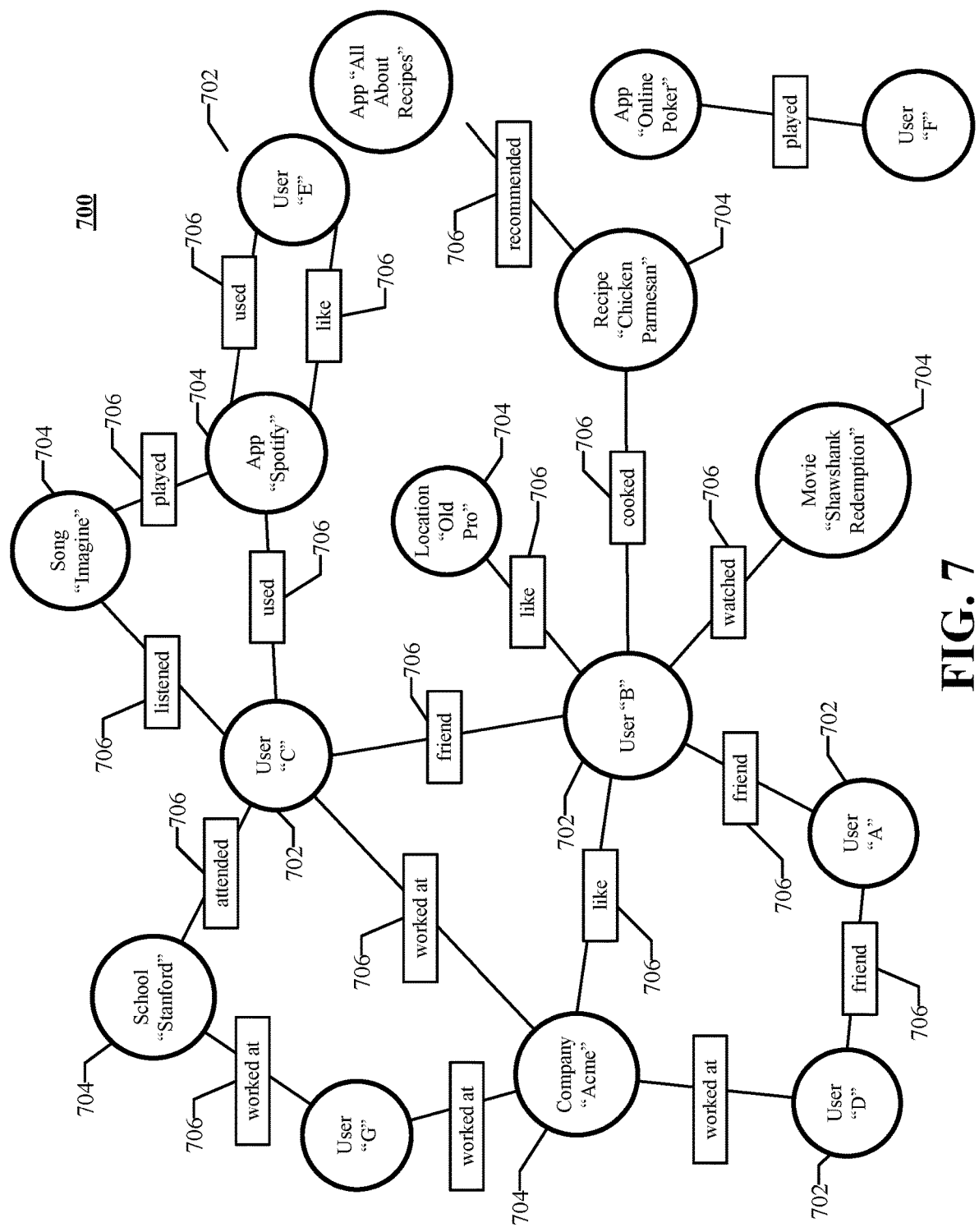
FIG. 7 illustrates an example social graph according to an example.

FIG. 7 illustrates example social graph 700. In some examples, computing architecture 100 (FIG. 1), process diagram 150 (FIG. 2), process diagram 180 (FIG. 3) and/or method 220 (FIG. 4) and/or method 230 (FIG. 5), already discussed may access social graph 700 to implement one or more aspects.

In particular examples, social-networking system 660 may store one or more social graphs 700 in one or more data stores. In particular examples, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 7 is shown, for didactic purposes, in a two-dimensional visual map representation. In particular examples, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular examples, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular examples, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular examples, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular examples, a user node 702 may be associated with one or more data objects corresponding to information associated with a user. In particular examples, a user node 702 may correspond to one or more webpages.

In particular examples, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular examples, a concept node 704 may be associated with one or more data objects corresponding to information associated with concept node 704. In particular examples, a concept node 704 may correspond to one or more webpages.

In particular examples, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular examples, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular examples, a pair of nodes in social graph 700 may be connected to each other by one or more edges 706. An edge 706 connecting a pair of nodes may represent a relationship between the pair of nodes. In particular examples, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular examples, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 6) between user nodes 702 corresponding to the user and concept nodes 704 corresponding to the song and application to indicate that the user listened to the song and used the application. Moreover, social-networking system 660 may create a "played" edge 706 (as illustrated in FIG. 6) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular examples, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular examples, social-networking system 660 may store an edge 706 in one or more data stores. In particular examples, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Social Graph Affinity and Coefficient

In particular examples, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular examples, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular examples, social-networking system 660 may use a variety of factors to calculate a coefficient. These factors may include, for example, user actions, types of relationships between objects, location information, other suitable factors, or any combination thereof. In particular examples, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular examples, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular examples, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular examples, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular examples, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular examples, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than user nodes 702 that are connected by a friend-type edge. In other words, depending upon the weights assigned to the actions and relationships for the particular user, the overall affinity may be determined to be higher for content about the user's spouse than for content about the user's friend. In particular examples, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular examples, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular examples, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular examples, social-networking system 660 may calculate a coefficient based on location information. Objects that are geographically closer to each other may be considered to be more related or of more interest to each other than more distant objects. In particular examples, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular examples, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular examples, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular examples, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular examples, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular examples, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular examples may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular examples, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular examples, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular examples, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular examples, privacy settings may allow users to opt in or opt out of having their actions logged by social-networking system 660 or shared with other systems (e.g., third-party system 670). In particular examples, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular examples, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
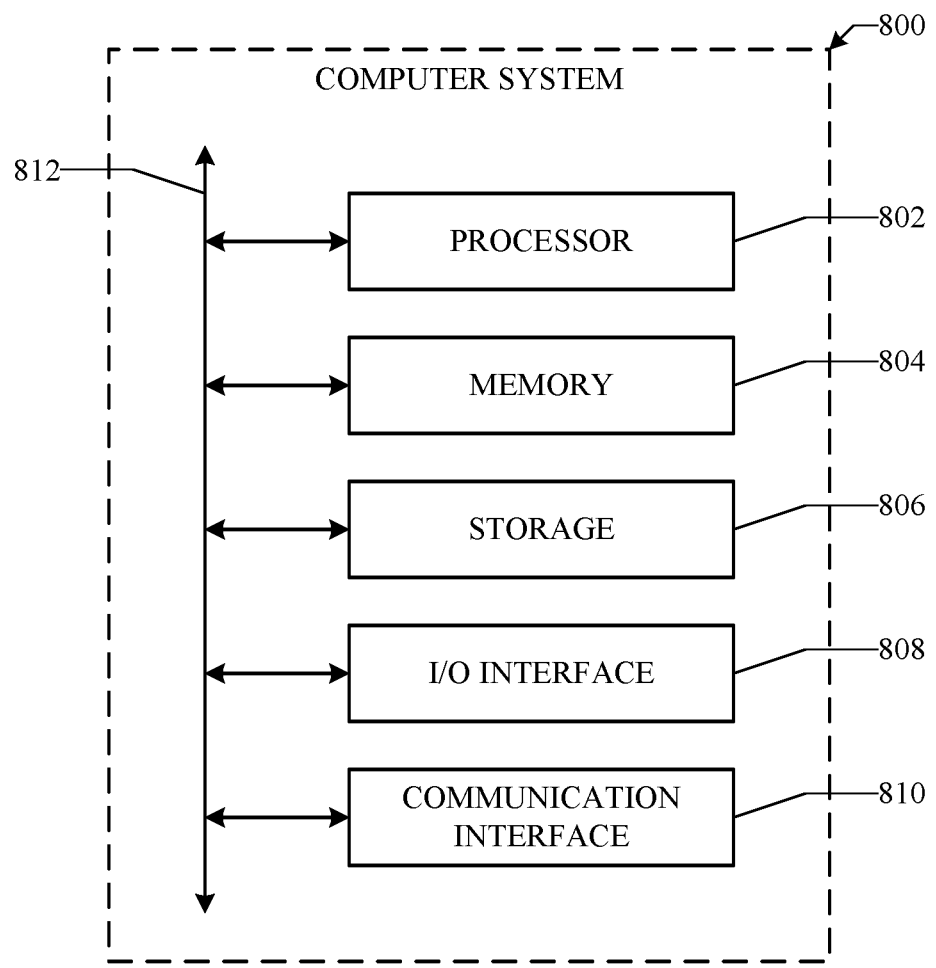
FIG. 8 illustrates an example computer system according to an example.

FIG. 8 illustrates an example computer system 800. The system 800 may implement one or more aspects of the computing architecture 100 (FIG. 1), process diagram 150 (FIG. 2), process diagram 180 (FIG. 3) and/or method 220 (FIG. 4) and/or method 230 (FIG. 5), already discussed. In particular examples, one or more computer systems 800 perform one or more steps of one or more methods described or illustrated herein. In particular examples, one or more computer systems 800 provide functionality described or illustrated herein. In particular examples, software running on one or more computer systems 800 performs one or more steps of one or more methods described or illustrated herein or provides functionality described or illustrated herein. Particular examples include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular examples, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular examples, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular examples, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular examples, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular examples, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular examples, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular examples, one or more memory management units (MMUs) reside between processor 802 and memory 804 and facilitate accesses to memory 804 requested by processor 802. In particular examples, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular examples, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular examples, storage 806 is non-volatile, solid-state memory. In particular examples, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular examples, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular examples, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular examples, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Thus, technology described herein may support a granular image enhancement selection process. The technology may substantially reduce the memory needed to store listings, the time needed to consummate a transaction and preserve valuable compute resources as well as bandwidth.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary examples to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although examples are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the examples. Further, arrangements may be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. At least one non-transitory computer readable storage medium comprising a set of instructions, which when executed by a computing system, cause the computing system to:
    determine that a primary slice of a plurality of slices of a communication network is overloaded, wherein the plurality of slices includes a backup slice;
    assign user equipment to operate with the backup slice in response to the primary slice being overloaded;
    identify that a trigger has occurred, wherein the trigger is associated with at least one of: a capacity metric of the primary slice not meeting a threshold, or a capacity metric of the backup slice reaching a backup capacity threshold;
    re-assign the user equipment to the primary slice from the backup slice so that the user equipment operates with the primary slice;

transmit, from the communication network and based on the trigger, a message to the user equipment that the user equipment is to be re-assigned to the primary slice;

determine that the user equipment has not initiated a switch process to switch operation of the user equipment to the primary slice within a predetermined amount of time; and determine that the primary slice is to initiate the switch process based on the user equipment not having initiated the switch process within the predetermined amount of time.

2. The at least one non-transitory computer readable storage medium of claim 1, further wherein the trigger is associated with a quality metric of the user equipment associated with the backup slice.

3. The at least one non-transitory computer readable storage medium of claim 1, wherein the instructions, when executed, cause the computing system to:

initiate, with the user equipment, the switch process to switch operation of the user equipment to the primary slice, wherein the switch process includes transmitting one or more session message establishment parameters to the primary slice; and transmit data from the user equipment over the primary slice.

4. The at least one non-transitory computer readable storage medium of claim 1, the instructions, when executed, cause the computing system to:

initiate, based in part on the trigger occurring and with the primary slice, the switch process to switch operation of the user equipment to the primary slice, wherein the switch process includes generating one or more session message establishment parameters for the user equipment to communicate; and transmit data from the user equipment over the primary slice.

5. The at least one non-transitory computer readable storage medium of claim 1, wherein the primary slice is dedicated to the communication network, and the backup slice is not dedicated to the communication network.

6. The at least one non-transitory computer readable storage medium of claim 1, wherein the primary slice is temporarily overloaded.

7. The at least one non-transitory computer readable storage medium of claim 1, wherein the primary slice cannot satisfy quality-of-service requirements when overloaded.

8. A system comprising:

one or more processors; and a memory coupled to the one or more processors, the memory comprising instructions executable by the one or more processors, the one or more processors being operable when executing the instructions to:

determine that a primary slice of a plurality of slices of a communication network is overloaded, wherein the plurality of slices includes a backup slice;

assign user equipment to operate with the backup slice in response to the primary slice being overloaded;

identify that a trigger has occurred, wherein the trigger is associated with at least one of: a capacity metric of the primary slice not meeting a threshold, or a capacity metric of the backup slice reaching a backup capacity threshold;

re-assign the user equipment to the primary slice from the backup slice so that the user equipment operates with the primary slice;

transmit, from the communication network and based on the trigger having occurred, a message to the user equipment that the user equipment is to be re-assigned to the primary slice;

determine that the user equipment has not initiated the switch process to switch operation of the user equipment to the primary slice within a predetermined amount of time; and determine that the primary slice is to initiate the switch process based on the user equipment not having initiated the switch process within the predetermined amount of time.

9. The system of claim 8, further wherein the trigger is associated with a quality metric of the user equipment associated with the backup slice.

10. The system of claim 8, further wherein the one or more processors are further operable when executing the instructions to:

initiate, with the user equipment, the switch process to switch operation of the user equipment to the primary slice, wherein the switch process includes transmitting one or more session message establishment parameters to the primary slice; and transmit data from the user equipment over the primary slice.

11. The system of claim 8, wherein the one or more processors are further operable when executing the instructions to:

initiate, based in part on the trigger occurring and with the primary slice, the switch process to switch operation of the user equipment to the primary slice, wherein the switch process includes generating one or more session message establishment parameters for the user equipment to communicate; and transmit data from the user equipment over the primary slice.

12. The system of claim 8, wherein the primary slice is dedicated to the communication network, and the backup slice is not dedicated to the communication network.

13. The system of claim 8, wherein the primary slice is temporarily overloaded.

14. The system of claim 8, wherein the primary slice cannot satisfy quality-of-service requirements when overloaded.

15. A method comprising:

determining that a primary slice of a plurality of slices of a communication network is overloaded, wherein the plurality of slices includes a backup slice;

assigning user equipment to operate with the backup slice in response to the primary slice being overloaded;

identifying that a trigger has occurred, wherein the trigger is associated with at least one of: a capacity metric of the primary slice not meeting a threshold, or a capacity metric of the backup slice reaching a backup capacity threshold;

re-assigning the user equipment to the primary slice from the backup slice so that the user equipment operates with the primary slice;

transmitting, from the communication network and based on the trigger having occurred, a message to the user equipment that the user equipment is to be re-assigned to the primary slice;

determining that the user equipment has not initiated the switch process to switch operation of the user equipment to the primary slice within a predetermined amount of time; and determining that the primary slice is to initiate the switch process based on the user equipment not having initiated the switch process within the predetermined amount of time.

16. The method of claim 15, further wherein the trigger is associated with a quality metric of the user equipment associated with the backup slice.

17. The method of claim 15, further comprising:
initiating, with the user equipment, the switch process to switch operation of the user equipment to the primary slice, wherein the switch process includes transmitting one or more session message establishment parameters to the primary slice; and
transmitting data from the user equipment over the primary slice.

18. The method of claim 15, further comprising:
initiating, based in part on the trigger occurring and with the primary slice, the switch process to switch operation of the user equipment to the primary slice, wherein the switch process includes generating one or more session message establishment parameters for the user equipment to communicate; and
transmitting data from the user equipment over the primary slice.

19. The method of claim 15, wherein the primary slice is dedicated to the communication network, and the backup slice is not dedicated to the communication network.

20. The method of claim 15, wherein the primary slice is temporarily overloaded.

* * * * *